April 23, 1940.   F. S. CARTWRIGHT   2,198,076
MOTOR VEHICLE CONTROL
Filed Feb. 6, 1937   4 Sheets-Sheet 1
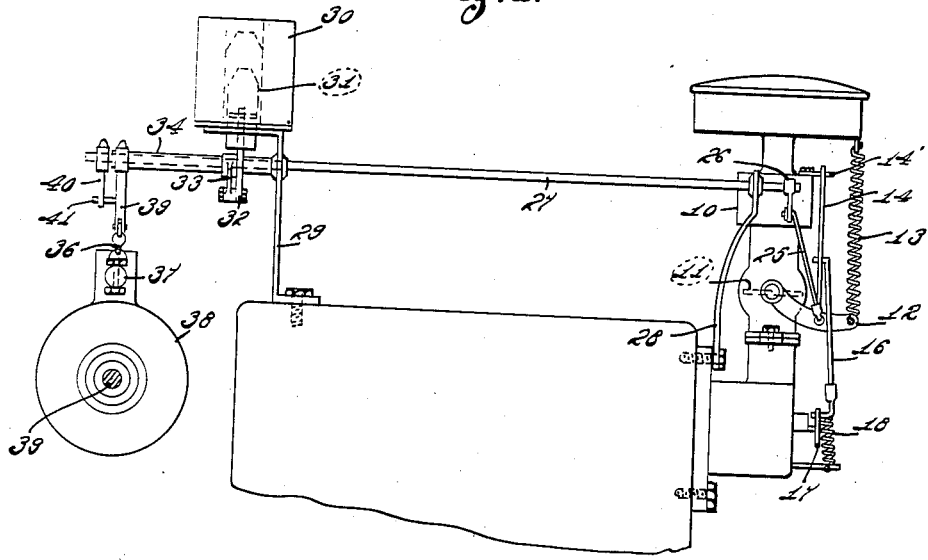
INVENTOR.
Forest S. Cartwright,
BY Hood & Hahn.
ATTORNEYS.

April 23, 1940.                F. S. CARTWRIGHT                2,198,076
                              MOTOR VEHICLE CONTROL
                              Filed Feb. 6, 1937              4 Sheets-Sheet 2
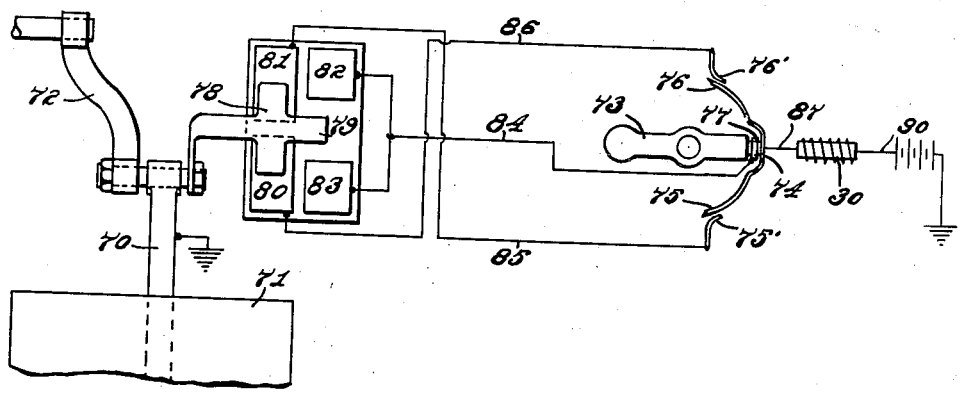
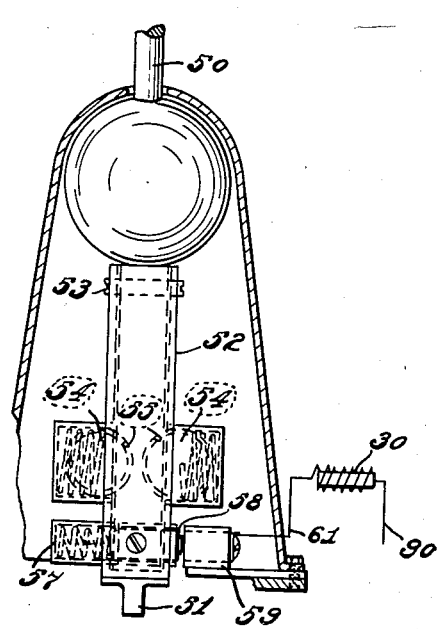
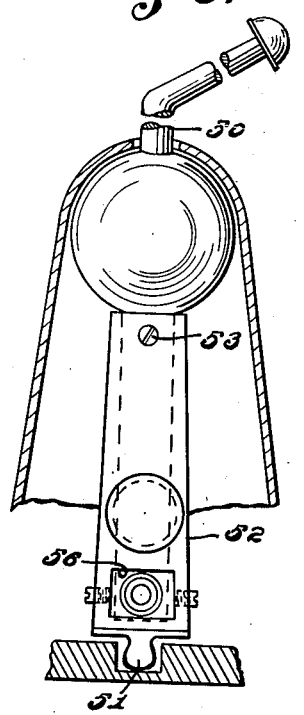
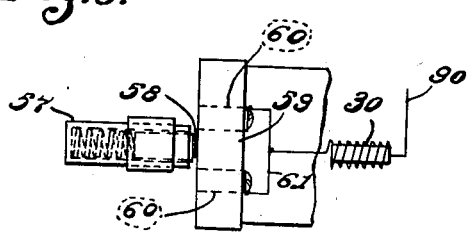
INVENTOR.
Forest S. Cartwright,
BY
Hood + Hahn.
ATTORNEYS.

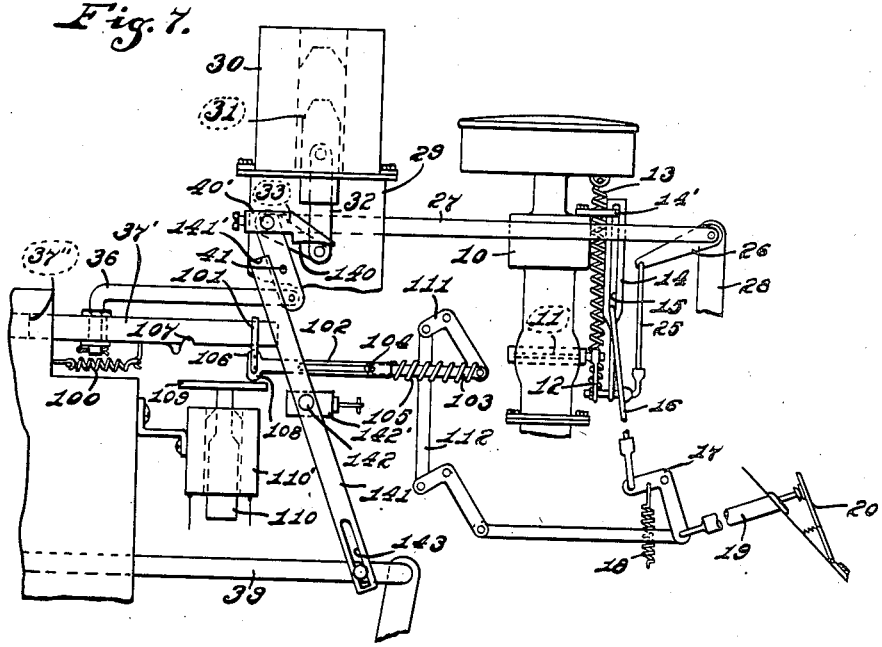

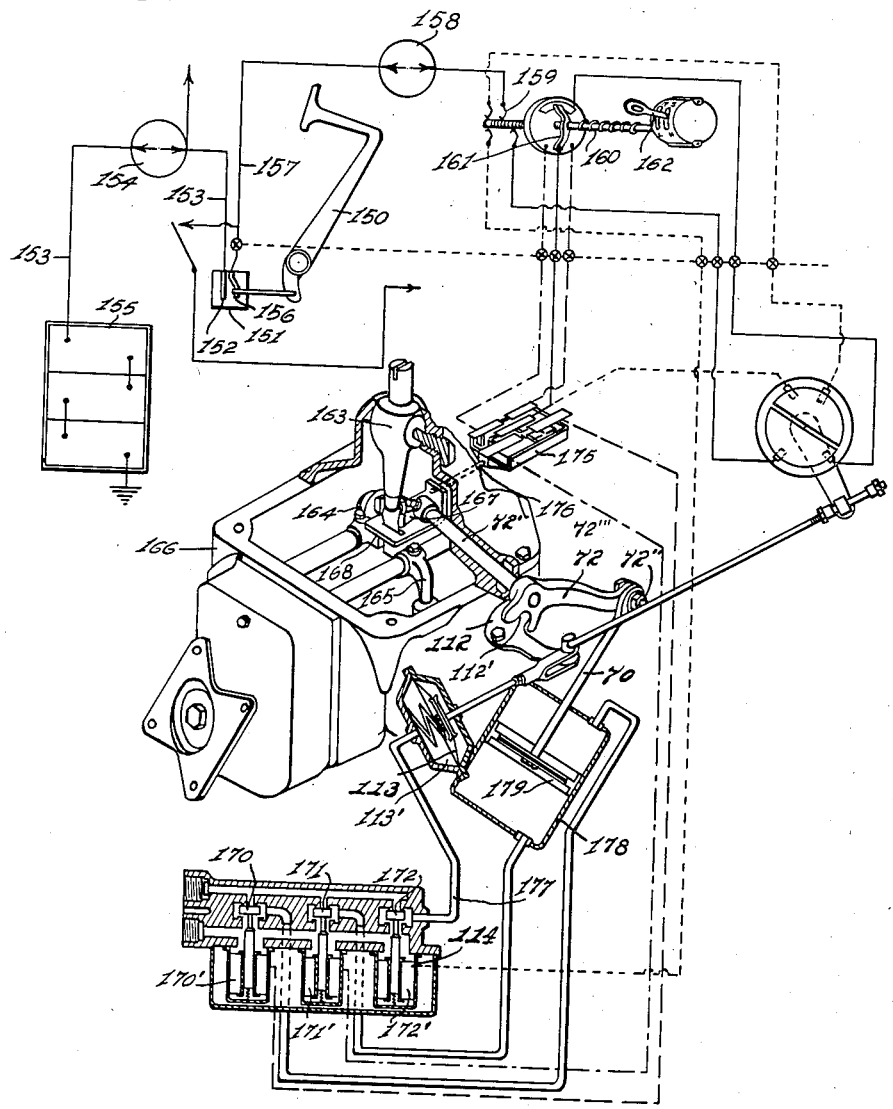

Patented Apr. 23, 1940

2,198,076

UNITED STATES PATENT OFFICE 2,198,076

MOTOR VEHICLE CONTROL

Forest S. Cartwright, Indianapolis, Ind.

Application February 6, 1937, Serial No. 124,449

14 Claims. (Cl. 192—.01)

In the operation of the average motor vehicle the operator, in order to effect a change in the driving gear ratio, at any driven speeds in excess of motor-idling speeds, must not only declutch the motor from the driving train but must also move the throttle valve (generally through the medium of the foot-controlled accelerator lever) to "closed" or "idling" position to avoid racing of the motor during the period of gear manipulation, and, when the gear shift has been effected, must open the throttle and reclutch the motor to the driving train.

Various devices have heretofore been provided to automatically perform some of these operations, such, for instance, as the so-called "electric hand" which, at the present time, is standard equipment in two well-known makes of automobiles.

The object of my present invention is, therefore, to provide mechanism which, in conjunction with any well-known or satisfactory gear-shifting mechanism, either manually or mechanically controlled, upon manipulation of the gear-shift control element, while the driver retains current super-idling speed setting of the driver-controlled throttle-valve-controlling element (accelerator lever) will act to automatically declutch the motor and close the throttle valve preliminary to gear shift and then restore the throttle valve to its immediately previous setting and reclutch the motor, all irrespective of whether the gear-shifting be toward a higher or a lower speed ratio, thereby insuring against motor stalling or racing at all times of gear shifting.

The accompanying drawings illustrate my invention:

Fig. 1 is a transverse elevation of apparatus embodying my invention;

Fig. 2 is a distorted side elevation of the parts shown in Fig. 1, together with a diagrammatic illustration of associated parts;

Fig. 3 is a diagrammatic illustration of an "electric-hand" gear shift coordinated with my device;

Fig. 4 a fragmentary side elevation of a modified hand gear shift lever for coordination with my device;

Fig. 5 an elevation at right angles to the plane of Fig. 4;

Fig. 6 an under plan of parts shown in Figs. 4 and 5;

Fig. 7 a view similar to Fig. 2 of a modification of my invention;

Fig. 8 a view similar to Fig. 3, showing an "electric hand" gear shift coordinated with the mechanism shown in Fig. 7;

Figs. 9 and 10 views similar to Figs. 4 and 5, show a modified hand gear shift coordinated with the structure shown in Fig. 7; and Fig. 11 a diagram of the so-called "electric hand" mechanism.

In the drawings 10 indicates a carburetor of any desired type provided with a throttle valve 11 to which is attached an operating arm 12 spring biased to closed position by the spring 13. Pivotally attached to arm 12 is a slotted link 14 held in position for vertical reciprocation by finger 14', the tip of which lies in the upper end of slot 15 of the link. Hooked into slot 15 is the upper end of a finger 16, the lower end of which is pivotally connected to a bell-crank lever 17 spring biased, in opposition to spring 13, by a spring 18 capable of overpowering spring 13. Bell-crank lever 17 is connected by the usual Bowden wire 19 with the accelerator pedal 20, the connection being such that depression of said pedal, in the usual manner, will position finger 17 to determine the limit of possible opening movement of throttle valve 11 under the urge of spring 13.

A link 25, pivoted at one end to arm 12, is pivoted at the other end to an arm 26 carried by shaft 27 journalled in suitable supports 28 and 29, which last-mentioned support supports a solenoid coil 30 within which is reciprocably mounted a core 31 connected by a link 32 with an arm 33 attached to a tubular rock shaft 34 journalled on shaft 27 and provided with an arm 35 connected by a link 36 with the stem of the control valve 37 of an air cylinder 38 of the well-known Bendix clutch control, said cylinder 38 containing a piston connected by rod 39 with the clutch controlling pedal 39' of the automobile, said cylinder being connected through the ports A controlled by the valve B with the motor inlet manifold C, and atmosphere, in a well-known manner, whereby the piston is reciprocated to mechanically operate the clutch control pedal to clutch releasing position when the cylinder piston is actuated as a result of removal of atmospheric pressure on one side and is permitted to return to clutching position under the impulse of its actuating spring, in a well-known manner.

Attached to the rock-shaft 27 is an arm 40 having a oneway engagement with pin 41 carried by arm 35, the arrangement being such that, when the solenoid coil 30 is energized and plunger 31 drawn upwardly, pin 41 will engage arm 40 to rock-shaft 27 in a direction to actuate arm 12, through the medium of arm 26 and link 25, to move the throttle valve 11 against the bias of spring 13, to closed or idling position, this movement being permitted irrespective of the position of finger 16 under the influence of the accelerator pedal because of the oneway connection between said finger 16 and the link 14.

In the normal installation of the aforementioned Bendix clutch control, the controlling valve thereof has been so associated with the accelerator pedal that, when the said pedal is in its released position the valve will be moved to connect the cylinder with the inlet manifold to cause actuation of the piston to declutch the motor from the driving train and to permit an automatic reclutching as soon as the accelerator pedal is depressed a very small amount, thus permitting a free wheeling operation of the vehicle, under control of the driver, when the supply of fuel is only sufficient, or very little in excess of sufficient, to drive the motor at or about idling speed. This is, of course, a desirable condition and I, therefore, provide an energizing circuit 50 for the coil 30 said circuit comprising separable terminals 51 and 52 one of which is carried by the accelerator pedal to contact with its fellow terminal when the accelerator pedal is at idling position but separated therefrom when said pedal is moved from or to a desirable distance from the idling position.

For the purpose of my invention it is also necessary that the solenoid coil 30 be energized whenever the gear shifting element is in neutral position.

Where gear shifting is to be accomplished by hand manipulation, the gear shift lever 50 (Figs. 4, 5 and 6) is modified by removal of the usual gear yoke shifting lower end and substitution therefor of a yoke shifting finger or tip 51 carried by a carrier 52 pivoted upon the lower end of lever 50 at 53 and capable of a slight movement, either forward or back, relative to the lower end of lever 50. This carrier 52 is normally held in its intermediate or neutral position relative to lever 50 by means of spring pressed balls 54, 54 mounted in suitable pockets in carrier 52 and normally seating in pockets 55, 55 formed in the opposite faces of the lower end of lever 50.

The opposite walls of carrier 52 are perforated at 56 and near the lower end of lever 50 there is provided a spring pocket 57 within which is mounted a terminal brush 58 which, in the neutral position of the parts, rests against the adjacent face of an insulating block 59 within which are mounted two terminals 60, 60 upon opposite sides of the neutral position of terminal 58. Terminals 58, 60, 60 are in an energizing circuit 61 for the solenoid coil 30. When lever 50 is moved in either direction, forward or back, from neutral, the resistance offered by the shifting yokes to movement of tip 51 permits an initial movement of lever 50 to bring terminal 58 into contact with the appropriate terminal 60 so as to energize coil 30 whereupon, the lost motion between lever 50 and carrier 52 having been taken up, further movement of the shifting lever starts the shifting yoke of the speed changing gearing into movement and, as the lever 50 nears the end of its stroke, terminal 58 is carried beyond the contact of terminal 60 as the shifting yoke stroke is completed. When the lever 50 is released the spring balls 54 snap back into their pockets 55 and move lever 50 to its neutral position relative to carrier 52. On the return stroke of lever 50 toward neutral, contact is again made between terminal 58 and the adjacent terminal 60, to energize coil 30 and keep it energized until the lever nears its neutral position whereupon terminal 58 is separated from that terminal 60 to de-energize coil 30 and the spring balls 54 again snap back into their pockets to neutralize carrier 52 relative to lever 50.

My invention may be readily associated with mechanical gear shifting means provided as a substitute for the present better known hand operated gear shift mechanism, and in Fig. 3 I have indicated diagrammatically how this association may be accomplished in connection with the so-called Bendix "electric hand".

In that device a piston rod 70 responds to variations in pressure in a cylinder 71, and rod 70 acts upon an arm 72 of the yoke shifting mechanism of a standard speed gear transmission. The control of pressure acting upon piston rod 70 by means of a small hand lever 73 which is mounted upon the steering post and is a miniature edition of an ordinary hand gear shift lever rockable both laterally and forward and back in conjunction with a miniature H slot of well known form. Associated with the lever 73 is a fixed terminal plate 74 having spring tips 75, 76 and a spring terminal 77 adapted to be contacted with plate 74 by the action of lever 73 when said lever is in its neutral position. Associated with terminals 75, 76 are companion terminals 75' and 76', respectively. The rod 70 is grounded and carries a terminal 78 having a lateral intermediate tip 79. Terminal 78 contacts simultaneously with terminals 80 and 81 except at the opposite limits of the stroke of rod 70. Terminal tip 79 contacts alternately with terminals 82 and 83 which terminals are connected by wire 84 with spring terminal 77. Terminal 80 is connected by wire 85 with terminal 75' and terminal 81 is connected by wire 76 with terminal 76'. Thus far the mechanism just described is found in the so-called "electric hand" mechanism and in order to utilize my improvement in connection with such "electric hand" it is merely necessary to provide a ground connection for my coil 30, through the medium of wire 87 to terminal plate 77.

In Fig. 3, rod 70 and its associated terminals 78—79 is shown in neutral position and spring terminal 77 is held in contact with terminal 74 by lever 73 in its neutral position. When said lever 73 is swung clockwise it will release terminal 77 from contact with terminal 74 and will cause terminal 75 to contact with terminal 75' thereby establishing an energizing circuit for solenoid 30 as follows:

Hot wire 90, solenoid 30, 87, 74, 75, 75', 85, 80, 78, 70 to ground, thereby energizing the clutch release mechanism to release the clutch, and also moving the throttle valve to minimum fuel position, as previously described. This circuit is maintained until terminal 78 passes from contact with either terminals 80 or 81 (depending upon the direction of motion of rod 70 determined by the positioning of lever 73) said separation breaking the energizing circuit of solenoid 30 so that the clutch is restored to clutching position and the throttle valve is permitted to open to the point determined by the setting of finger 14'.

Movement of rod 70 to one of its extremes, say to contact 79 with 82, provides the following broken circuit for solenoid 30: Ground 70, 78—79, 82, 84, 77, brake 87, 30, 90, so that when 73 is moved to neutral, in anticipation of another gear shift positioning, coil 30 is energized and the clutch is declutched and the throttle valve is moved to minimum fuel position as previously described, whereupon, 73 being moved to contact 76 with 76', a retaining circuit for energization of coil 30 is established through 78, 86, 76', 76 and 87 to hold the declutched and minimum fuel positioning of the parts until the new gear relationship is established.

Figs. 7 to 11 illustrate modifications which provide for clutch control through the medium of the accelerator pedal while the gear shift control lever is in neutral, low and reverse, only, and provide for carburetor control, through the medium of the automatic declutching mechanism, to prevent motor "racing" before the clutch has taken hold.

In these figures, parts, the same as those in the preceding figures, are similarly numbered.

Link 36, however, has its outer end slidably mounted in a longitudinal slot 37'' in the stem of control valve 37' (valve 37 of Figs. 1 and 2) so as to be capable of shifting said control valve in the opening direction only, and valve 37' is yieldingly biased to closed position by spring 100.

Slidably associated with the stem of valve 37', by means of fork 101, is a composite link comprising the telescoped parts 102, 103, tied together by the pin and slot connection 104 and yieldingly held in extended relation by spring 105.

The outer end of part 102 is provided with a finger or teat 106 adapted to longitudinally interlock with the stem of valve 37' by entering notch 107, and is also provided with a portion 108 resting and riding upon a vertically movable plate or track 109 carried by the core 110 of a solenoid 110', the arrangement being such that, when the solenoid is energized, plate or track 109 will urge part 102 laterally toward the stem of valve 37' to force 106 into 107 and retain it therein whenever 106 is registered with 107.

The outer end of part 103 is pivotally connected to bell-crank lever 111 which is connected by link 112 to the accelerator pedal 20 in such manner that depression of said pedal, to increase gas supply, will move link 102—103 to the left (Fig. 7) i. e., in the direction of closing movement of valve 37'.

In order to energize the solenoid when the gear shift control element is in selected positions only, various mechanisms, analogous to those now to be described, may be provided.

For instance, when the car is equipped with the so-called "electric hand" gear shift mechanism, illustrated diagrammatically in Fig. 11, there will be the gear shift cylinder having piston stem 70 which actuates arm 72 of a rockshaft 72' which is axially shifted, through the medium of rocker-fork 112, diaphragm 113 and control valve 114. Consequently I provide the wrist pin 72'' of arm 72 with a grounded contact finger 78' having contact points 115, 116, 117, and 118 coordinated with arc-shaped terminal plates 80, 81, 82, 83 and 124 arranged to be traversed by said contact points as arm 72 is swung.

Contacts 115 and 116 respectively traverse and remain in contact with terminal plates 80 and 81 in all positions of the outer end of arm 72. Contact 117 alternately contacts terminal plates 82 and 83, (which are electrically integral by reason of connection 123) when arm 72 is swung in either direction from neutral, and is out of contact with each of said plates when arm 72 is in neutral. Terminal plate 124 is so shaped (conveniently T-shaped as shown) that at all times when arm 72 is in low gear or reverse gear positions (and while passing to and from said gear positions) contact point 118 will be in contact therewith and, when arm 72 is shifted axially preparatory to second gear or high gear position, but when said arm is rocked in either direction from neutral toward second gear or high gear position, point 118 will pass off from said plate 124, as will be clearly apparent from an inspection of Fig. 8.

Plate 124 is connected by wire 125 with one end of the coil of solenoid 110' the opposite end of said coil being connected to a hot wire 126.

Plates 80 and 81 are connected, respectively, by wires 86 and 85 with terminals 76' and 75' which, through the spring fingers 76 and 75, respectively, connect with the coil of solenoid 30. Plates 82 and 83 are connected by wire 84 with spring terminal 77.

In the structure now under consideration, if gear shifting is to be accomplished by hand (instead of by the "electric hand") the gear shift lever 50 is modified (as described in connection with Fig. 5) by the carrier 52' (similar to 52, Fig. 5). The lever 50 is, as is well known, capable of forward and rearward swing to cause gear shifting, and lateral swing to position its lower end for gear shift selection, and the carrier 52' has a limited swing upon the lower end of the lever in the plane of gear shift movement.

Carrier 52' is provided with two grounded contacts 130, 131 mounted for movement in a line transverse to the plane of gear shift movement of lever 50 and are spring-urged outwardly in opposite directions by spring 132, outward movement of contact 130 being limited by shoulder 133.

Terminal plate 134 is arranged to be engaged by contact 130 only when lever 50 is in its selective position for low gear and reverse gear, there being no contact of 130 on 134 when the lever 50 is in its medial position or in its selective position for second gear and high gear.

Contact 131 cooperates selectively with terminal plates 135, 136 and 137 in all positions of lever 50, i. e., with 136 when in medial position, and respectively with 135 or 137 when shifted forward or back from medial position.

Terminals 134 and 136 are connected by wire 138 with the coil of solenoid 110' while terminals 135 and 137 are connected by wire 139 with the coil of solenoid 30. Consequently solenoid 110' is energized whenever lever 50 is in medial (forward and back) position whether in neutral or in either gear-shift-selective position and is also energized while lever 50 moves to and occupies either low gear or reverse gear position, and is de-energized while lever 50 moves to and occupies either second gear or high gear position. Also solenoid 30 is energized when lever 50 moves from medial position to occupy any one of the four selective gear positions.

In order to prevent motor racing arm 40 of Figs. 1 and 2 is replaced by arm 40' which performs the function of arm 40 and in addition is provided with a stop-arc 140 positioned and proportioned to cooperate with a stop lever 141 pivoted at 142 (on a laterally adjustable support 142' if desired). Lever 141 is connected by pin and slot connection 143 with the stem 39 of the automatic declutching mechanism.

Spring 13, through the medium of arm 12 biases the throttle valve 11 to fully open position and, through the medium of link 25, arm 26 and shaft 27, biases arm 40' to a position which will be dependent upon the spring-biased movement of arm 12 permitted through the medium of link 14 and finger 16, the maximum spring-urged movement of arm 40' occuring when the accelerator pedal has been fully depressed, and the minimum position of arm 40' occurring, as the result of the pull of 16 on 14 acting on 25, 26 and 27 when the acceleration of pedal is in released or idling position, at which time arc 140 is so positioned that the upper end of lever 141 may swing under the stop surface 140. The connection of 141 with 39 is such that, as 39 moves to the left (Figs. 2 and 7) in its declutching movement, carrier 141' of 141 passes under carrier 140 and, during movement of 39 in its opposite clutching movement carrier 141' passes from under carrier 140 approximately at the time of clutch engagement so that, at the movement of clutching, shaft 27 is released to permit spring 13 to move the throttle valve in opening direction to an extent determined by the then position of the accelerator pedal and the consequent setting of finger 16. Additional fuel is thus supplied to the motor approximately at the moment of clutching so that motor racing cannot occur.

Assuming that the electric circuits are connected to the battery, through the medium of the ignition key, or otherwise, it will be noted that, with the gear-selector (50 in Fig. 9, or 72-114 in Fig. 8) in neutral or laterally displaced medial position solenoid 110' will be energized to cause track 109 to press 106 of 102 upon 37', and that if the gear-selector (73 Fig. 8; 50 Fig. 7) is then shifted to either low gear or reverse gear position the energization of 110' will be maintained and 30 will be energized to move valve 37' to the right (Fig. 7) to bring 107 into position to receive 106 and thus interlock the control valve of the automatic declutching mechanism with the accelerator pedal. The aforesaid interlocking will be maintained so long as 110' remains energized, so that the operator may obtain mechanical declutching operation during such times of energization of 110' by permitting the accelerator pedal to move to or near idling position.

Spring 103 permits opening manipulation of valve 37' through the medium of solenoid 30 even though that valve be interlocked with accelerator pedal, and the pin and slot connection of 125 with 37' permits opening movement of said valve by the accelerator pedal when solenoid 30 is not energized.

The construction diagrammatically illustrated in Fig. 11 is, in itself, not a part of my invention but is the so-called "electric hand" gear shift mechanism which was on the market at the time of filing this application. The clutch pedal 150 controls a circuit breaker 151, the terminal 152 of which is connected by wires 153 through the ignition switch 154 to a battery 155. The other terminal 156 is connected by a wire 157 through a cutout switch 158 with a brush contact 159 contacting with the shaft 160 which is positioned by the selective lever 162 generally carried on the steering post.

The usual hand controlled gear shift 163 is cooperative with the usual shifting forks 164—165 of an ordinary gear shift box 166. The gear shift lever 163 is also associated with a yoke 167 carried by the shaft 72' which is both rockable and axially shiftable and is also associated with a sliding plate 168 which is associated with shaft 72' so as to partake of the rocking movements of shaft 72' to cause axial shifting of the forks 164—165. Arm 72 on shaft 72' is provided with a radially extending plate-like portion 72''' which can traverse in a notch 112' in lever 112, the arrangement being such that rocking movements of shaft 72' may be accomplished without causing movement of lever 112 and rocking movements of lever 112 will cause axial shifting of shaft 72'. The control valve 114 comprises a plurality of valves 170, 171 and 172, each controlled by its own solenoid 170', 171' and 172', respectively, which are in circuit with the switch 161 and a switch 175, the terminals of which are selectively positioned by reason of the connection 176. The valves 170, 171 and 172 control the flow of fluid pressure to and from the pressure chamber 113', which affects diaphragm 113 through the conduit 177 and these valves 170, 171 and 172 also control the flow of fluid pressure to the cylinder 178 in which is the piston 179 which carries the piston rod 70.

This construction, which is well known, is such that, by manipulation of the selective element 162 shaft 72', by an appropriate rocking and axial shifting, accomplished selectively by controlled movements of the piston 179 and diaphragm 113, serve to selectively position the gears of the gear box 166.

I claim as my invention:

1. The combination of a motor of the internal-combustion type, a power train including a step-by-step speed-changing gearing, clutching means interposed between the motor and power train, a throttle valve controlling flow of fuel to the motor, operator-controlled means for positioning said throttle valve, power-actuated means for alternatively positioning said clutching means, a second power-actuated means for selectively positioning the speed changing gearing, including an operator-controlled selector, a control element for controlling the application of power to the power-actuated clutch-operating means, a third power-actuated means, connections between said third power-actuated means, the power-controlling element of the clutch operating means, and the throttle valve whereby declutching is accompanied by throttle-valve minimum-fuel positioning and means controlled by the gear-shift selector for controlling application of power to said third power-actuated means.

2. The combination of a motor of the internal-combustion type, a power train including a step-by-step speed-changing gearing, clutching means interposed between the motor and power train, a throttle valve controlling flow of fuel to the motor, operator-controlled means for positioning said throttle valve, power-actuated means for alternatively positioning said clutching means, a second power-actuated means for selectively positioning the speed changing gearing, including an operator-controlled selector, a control element for controlling the application of power to the power-actuated clutch-operating means, a third power-actuated means, connections between said third power-actuated means, the power-controlling element of the clutch operating means, and the throttle valve whereby declutching is accompanied by throttle-valve minimum-fuel positioning and means controlled by the gear shift selector for controlling application of power to said third power-actuated means, the connection between said third power-actuated means and throttle valve and between said third power-actuated means and the control element of the second power-actuated means being such that actuation of the throttle valve to minimum fuel position by said third power-actuated means is independent of the operator-controlled throttle valve positioning means.

3. Apparatus of the character specified in claim 1 and including means controlled by the operator-controlled means for the throttle valve for controlling the application of power to said third power-actuated means.

4. Apparatus of the character specified in claim 2 and including means controlled by the operator-controlled means for the throttle valve for controlling the application of power to said third power-actuated means.

5. The combination of a motor of the internal-combustion type, a power train including a step-by-step speed-change gearing, clutching means interposed between the motor and power train, a throttle valve controlling flow of fuel to the motor, operator-controlled means for positioning said throttle valve, power-actuated means for alternatively positioning the clutching means, a second power-actuated means for selectively positioning the speed changing gearing including an operator-controlled selector, a control element for controlling the application of power to the power-actuated clutch-operating means, a solenoid, connections between said solenoid, the control element of the clutch-operating means and the throttle valve whereby declutching is accompanied by throttle-valve minimum-fuel positioning, and an energizing circuit for said solenoid controlled by the gear shift selector.

6. The combination of a motor of the internal-combustion type, a power train including a step-by-step speed-change gearing, clutching means interposed between the motor and power train, a throttle valve controlling flow of fuel to the motor, operator-controlled means for positioning said throttle valve, power-actuated means for alternatively positioning the clutching means, means for selectively positioning the speed changing gearing, a control element for controlling the application of power to the power-actuated clutch-operating means, a solenoid, connections between said solenoid, the control element of the clutch-operating means and the throttle valve whereby declutching is accompanied by throttle valve minimum-fuel positioning, and an energizing circuit for said solenoid controlled by the gear shift, the connections between the solenoid, the throttle valve and the control element of the power clutch operator being such that actuation of the throttle valve to minimum-fuel position by said solenoid is independent of the operator-controlled throttle valve positioning means.

7. The combination of a motor of the internal-combustion type, a power train including a step-by-step speed-change gearing, clutching means interposed between the motor and power train, a throttle valve controlling flow of fuel to the motor, operator-controlled means for positioning said throttle valve, power-actuated means for alternatively positioning the clutching means, a second power-actuated means for selectively positioning the speed changing gearing, including an operator-controlled selector, a control element for controlling the application of power to the power-actuated clutch-operating means, a solenoid, connections between said solenoid, the control element of the clutch-operating means and the throttle valve whereby declutching is accompanied by throttle valve minimum-fuel positioning, and an energizing circuit for said solenoid controlled by the gear shift selector, the connections between the solenoid, the throttle valve, and the control element of the power clutch operator being such that actuation of the throttle valve to minimum-fuel position by said solenoid is independent of the operator-controlled throttle valve positioning means.

8. Apparatus of the character specified in claim 5 and including an energizing circuit for the solenoid, including a circuit-control influenced by the operator-controlled means for positioning the throttle valve.

9. Apparatus of the character specified in claim 6 and including an energizing circuit for the solenoid, including a circuit-control influenced by the operator-controlled means for positioning the throttle valve.

10. Apparatus of the character specified in claim 7 and including an energizing circuit for the solenoid, including a circuit-control influenced by the operator-controlled means for positioning the throttle valve.

11. The combination of a motor of the internal-combustion type, a power train including a step-by-step speed-change gearing, clutching means interposed between the motor and power train, a throttle valve controlling flow of fuel to the motor and biased to maximum-fuel position, an accelerator pedal biased to minimum-fuel position, connections between said pedal and throttle valve comprising two elements having a one-way interlock toward minimum-fuel positioning of the throttle valve by the bias of the pedal, power-actuated means for alternatively positioning the clutching means, a control element controlling application of power to said power-actuated means, a second power-actuated means, a two-way connection between said second power-actuated means and the throttle valve, and a one-way connection between said second power-actuated means and the control element of the power-actuated clutch-operating means.

12. In a motor vehicle, the combination of a speed change gearing of a step-by-step type and embodying a controlling lever comprising a force-receiving element and a force-delivering element, one having a limited movement relative to the other, a power actuated means, clutch-operating means including a control element, a solenoid, connections between said solenoid and the control element of the power-actuated clutch-operating means, and an energizing circuit for said solenoid, said circuit including separable terminals one of which is carried by the said force-receiving element whereby said solenoid is energized to cause power-actuated declutching preliminary to gear shift.

13. The combination of a motor of the internal combustion type, a power train including a step-by-step speed-change gearing, clutching means interposed between the motor and power train, a throttle valve controlling flow of fuel to the motor, operator-controlled means for primarily predetermining a current maximum-fuel-positioning of the throttle valve, power-actuated means for shifting the clutching means to declutched position, means for selectively positioning the speed-changing gearing, a control-element for controlling the application of power to the power-actuated clutch-operating means, a solenoid, connections between said solenoid, the control element of the clutch-operating means and the throttle valve whereby declutching is accompanied by throttle-valve minimum-fuel positioning, an energizing circuit for said solenoid controlled by the gear shift, connections between said operator-controlled means and the control element for controlling the application of power to the power-actuated clutch-operating means comprising a pair of separable elements, a second solenoid, means controlled by said second solenoid for establishing or disestablishing connection between said separable elements, and an energizing circuit for said second solenoid comprising separable contacts controlled by the gearshift.

14. Mechanism of the character specified in claim 13 and including means controlled by the clutch-operating means for preventing opening movement of the fuel valve until approximately the time of clutch engagement.

FOREST S. CARTWRIGHT.